United States Patent [19]
Hobart

[11] 3,938,601
[45] Feb. 17, 1976

[54] WEIGHING METHOD AND APPARATUS

[75] Inventor: Jack Hobart, Leamington Spa, England

[73] Assignee: Hobart Engineering Limited, England

[22] Filed: July 17, 1974

[21] Appl. No.: 489,833

[30] Foreign Application Priority Data
July 17, 1973 United Kingdom............ 34038/73

[52] U.S. Cl. ............. 177/1; 177/123; 177/DIG. 11
[51] Int. Cl.² .......................................... G01G 13/02
[58] Field of Search ......... 177/1, 122, 123, DIG. 11

[56] References Cited
UNITED STATES PATENTS

| | | |
|---|---|---|
| 2,324,667 | 7/1943 | Baker et al. ................... 177/123 X |
| 2,626,042 | 1/1953 | Aldridge ....................... 177/DIG. 11 |
| 3,117,639 | 1/1964 | Dreeben ....................... 177/DIG. 11 |
| 3,557,889 | 1/1971 | Rajsa ............................... 177/123 X |
| 3,690,391 | 9/1972 | Rust................................. 177/123 X |
| 3,708,025 | 1/1973 | Soler et al............................. 177/1 |
| 3,720,276 | 3/1973 | Banks ................................ 177/122 |

Primary Examiner—George H. Miller, Jr.

[57] ABSTRACT

Weighing apparatus conveys irregular pieces of product to a grading device for separating the regular pieces into two fractions respectively containing relatively smaller-sized pieces and relatively larger-sized pieces. A second conveyor conveys the larger-sized pieces to a weighing device until a batch of the product is accumulated having a weight slightly less than the required batch weight, and a third conveyor adds smaller-sized pieces to the batch until the minimum batch weight is achieved.

9 Claims, 11 Drawing Figures

WEIGHING METHOD AND APPARATUS

This invention relates to a method of, and apparatus for, weighing a product made up of irregular pieces into a batch of predetermined weight. The invention is particularly intended for use with lightweight free-flowing products which are difficult to weigh automatically into batches of predetermined weight due to irregularity in the size of the individual pieces. Typical products with which this difficulty is encountered are, for example, potato crisps and other lightweight food products having pieces of irregular size. These products are usually sealed in bags and are sold on the basis that each bag contains a minimum weight of the product. As it is essential that the contents of each bag do not fall below the declared minimum weight, it is usual to continue adding pieces of the product indescriminately, until the last piece added makes the total weight exceed the stipulated minimum. In this manner, if the last piece of product added is of a comparatively large size, the final weight can substantially exceed the declared minimum. When one ounce bags of potato crisps are being packed it has been found that the contents average 3 drams (3/16 ounce) overweight, and this "give-away" of the product reduces the profit margin accordingly.

According to one aspect of the invention a method of weighing a product made up of irregular pieces into a batch of predetermined weight includes grading a flow of the irregular pieces to separate smaller-sized pieces from the flow, conveying the remaining flow of pieces towards a weighing device, delivering pieces from the remaining flow to the weighing device until a batch of the product is accumulated having a weight slightly less than said predetermined weight, separately conveying the smaller-sized pieces towards the weighing device, and adding these smaller-sized pieces to the batch until the said predetermined weight is just achieved. In this manner each batch can be made up to a value less than the predetermined minimum weight by an amount equivalent to the heaviest anticipated piece of product, and is subsequently brought up to the minimum weight in the smallest possible increments. By adopting this technique we have found that the average give-away can be reduced to about one dram (1/16 ounce) on a bag of potato crisps.

The method preferably includes grading the entire flow of irregular pieces to separate a supply of smaller-sized pieces which will be more than adequate for making successive batches up to the said predetermined weight, and returning the prevailing surplus supply of smaller-sized pieces to the remaining flow before it reaches the weighing device. Grading the entire flow of the product enables the smallest pieces to be separated whilst ensuring a plentiful supply for bringing each batch up to the required minimum weight. Separating an excessive supply of smaller-sized pieces ensures that the technique will not fail due to an inadequate supply of the smaller-sized pieces during fluctuations in the proportion of small pieces in the flow of product. Returning the prevailing surplus supply of smaller-sized pieces avoids any problem of uncontrolled accumulation of the separated smaller-sized pieces.

The method also preferably includes delivering pieces from the remaining flow to a first weighing station of the weighing machine until a batch of the product is accumulated having a weight slightly less than said predetermined weight, subsequently transferring the batch to a second weighing station of the weighing machine for determining when the batch just achieves the said predetermined weight, and adding the smaller-sized pieces to the second weighing station whilst pieces are being delivered from the remaining flow to the first weighing station for accumulating the next batch. In this manner the weighing cycle is minimized.

According to another aspect of the invention apparatus, for weighing a product made up of irregular pieces into a batch of predetermined weight, includes a first conveyor means for conveying the irregular pieces to a grading device which is arranged to separate the irregular pieces into two fractions respectively containing relatively smaller-sized pieces and relatively larger-sized pieces, a weighing device for weighing pieces of the product, a second conveyor means for conveying the relatively larger-sized pieces from the grading device to the weighing device, a third conveyor means for conveying the relatively smaller-sized pieces from the grading device to the weighing device, and control means associated with the weighing device and the second and third conveyor means whereby the second conveyor means will be operated to deliver relatively larger-sized pieces to the weighing device until a batch has been accumulated having a weight slightly less than said predetermined weight and the third conveyor will be operated to add relatively smaller-sized pieces to the batch until the said predetermined weight is just achieved. Preferably a demand-sensing device is arranged operatively between the grading device and the third conveyor means for sensing the rate at which smaller-sized pieces should be supplied to the third conveyor means to maintain a satisfactory equilibrium and for returning any surplus supply of smaller-sized pieces to the second conveyor means. The demand sensing device may comprise a fourth conveyor means which conveys smaller-sized pieces from the grading device to the third conveyor means, the fourth conveyor means extends over a portion of the second conveyor means remote from the weighing device, and the fourth conveyor means is arranged so that any surplus supply of the smaller-sized pieces will accumulate on it and then fall onto the second conveyor means.

Preferably the weighing device has first and second weighing station, the second conveyor means is arranged to convey the larger-sized pieces to the first weighing station and the third conveyor means is arranged to convey the smaller-sized pieces to the second weighing station, and said control means is arranged to transfer a batch of accumulated pieces from the first station to the second weighing station when it has a weight slightly less than said predetermined weight whereby the third conveyor adds smaller-sized pieces to the partially completed batch at the second weighing station whilst the second conveyor is delivering larger-sized pieces to the first weighing station for accumulating the next batch.

The grading device preferably defines a supporting surface along which the pieces of product will travel in a predetermined direction towards an end edge of the supporting surface, and the width of the supporting surface decreases in the direction of travel of the pieces whereby the larger-sized pieces will fall off the supporting surface onto the second conveyor means before reaching the end edge, and smaller-sized pieces will fall off the end edge for delivery to the third conveyor means. The grading device may define two or more parallel channels which are bounded by parallel walls and have respective bases jointly defining the supporting surface, and each base terminates in two end edges which extend from the adjacent walls toward a generally V-shaped slot formed in the base. Preferably the base of each channel slopes downwardly towards both boundary walls to bias the pieces of product towards the walls during grading. The walls may project beyond the end edges of the channels to a position that is over the second conveyor means, whereby any larger-sized pieces that may become hooked over the tops of the walls will be returned to the flow of larger-sized pieces on the second conveyor means. Spacers may be secured to the sides of the walls to reduce the size of the pieces to be selected for delivery to the third conveyor means. The spacers for the adjacent walls of adjacent channels may be formed as an inverted U-shaped cover.

The invention is now described, by way of example only, with reference to the accompanying drawings in which.

Figure 1:
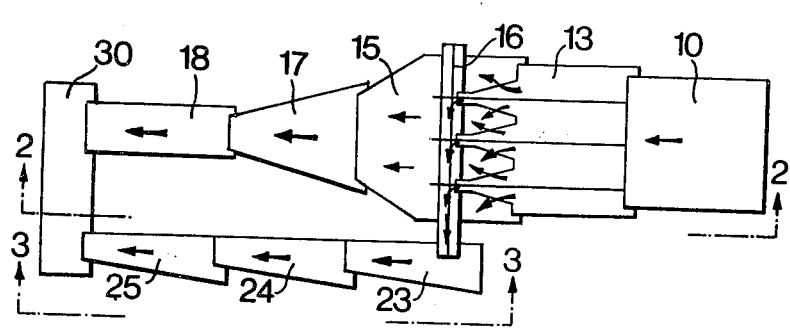
FIG. 1 is a diagrammatic plan view of one embodiment of the invention.
Figure 2:
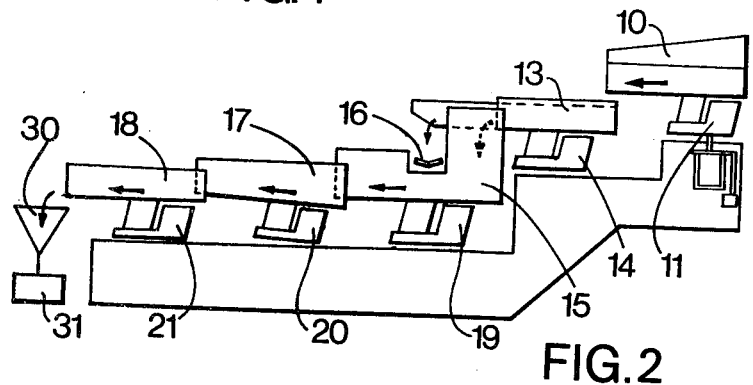
FIG. 2 is a side elevation on the line 2—2 in FIG. 1.
Figure 3:
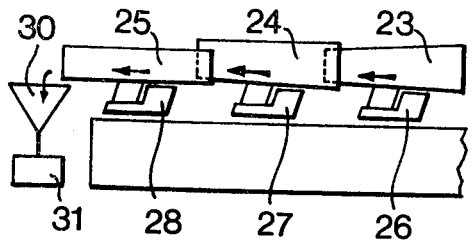
FIG. 3 is a side elevation on the line 3—3 in FIG. 1.

FIGS. 1 – 3 show apparatus which is suitable for separating potato crisps or like products into weighed batches. The product, in the form of irregular individual pieces of non-uniform size and weight, is fed from an unshown main supply conveyor into a receiving vibratory conveyor pan 10 fitted with vibrator means 11 and an unshown detecting means for detecting the total weight of product on the conveyor pan. The rate at which the vibrator means 11 is operated is variable according to the desired feed rate of the receiving conveyor pan 10. The detecting means may be of any suitable form and is conveniently a level control device, the level of the receiving conveyor pan 10 varying according to the total weight of the receiving conveyor pan 10 and its contents. The level control device may operate a level feeler device, an optical level detecting device or other weighing scale device by which an indication of the weight is given. If the receiving conveyor pan 10 is fed manually, a visual or audible signal may be given by the level control device, according to which signal more or less product is fed into the receiving conveyor pan 10. The rate of feed into the receiving conveyor pan 10 is also dependent on the demand of the weighing system. With automatic feeding the signal from the level control device causes the unshown main supply conveyor to operate to cause more or less product to be fed into the receiving conveyor pan 10. The level control device enables a continuous flow of product to be maintained at a rate that will achieve maximum efficiency of the system.

The receiving conveyor pan 10 spreads the product over its surface and delivers it to a conveying and grading pan 13 which is divided into four grading channels and is driven by a vibrator means 14 to convey the product whilst grading it into two fractions respectively containing smaller-sized pieces and relatively larger-sized pieces. At the end of each of the four channels the supporting surface defined by the base of the conveying and grading pan 13 is reduced so that relatively larger-sized pieces of the product can no longer be supported and will fall into a conveying pan 15 positioned beneath the conveying and grading pan 13. The relatively smaller-sized pieces of product travel further along the conveying and grading pan 13 until they reach the forward edge of the conveying and grading pan 13 and fall onto a shallow cross-conveyor pan 16. For convenience the relatively larger-sized fraction will hereinafter be termed the "bulk" product and the relatively smaller-sized fraction will be termed the "dribble" product. The construction and operation of the conveying and grading pan 13 will later be more fully described with reference to FIGS. 6 to 13.

As the cross-conveyor pan 16 is shallow and extends over the conveying pan 15, any excess dribble product will fall off the cross-conveyor pan 16 into the conveying pan 15 to join the bulk product.

Bulk product from the conveying and grading pan 13 and excess dribble product which falls into the conveying pan 15 is conveyed to an intermediate conveying pan 17 and then to a final conveying and discharge pan 18. The pans 15, 17 and 18 are each vibratory pans actuated by respective vibrator means 19, 20 and 21 and each pan serves to distribute the product thinly and evenly over its surface. If the product can be distributed relatively easily the intermediate conveying pan 17 can be omitted, the product then being fed directly from the conveying pan 15 to the final conveying and discharge pan 18. On the other hand additional intermediate conveyor pans may be provided for products which are difficult to distribute evenly.

The cross-conveyor pan 16 conveys the dribble product to a series of conveyor pans 23, 24 and 25. The pan 23 receives the dribble product from the cross-conveyor pan 16 and accumulates the dribble product for feeding to the pans 24 and 25 which serve to distribute the product thinly and evenly before final discharge from the pan 25. In common with all the conveyor pans of the system, each of the pans 16, 23, 24 and 25 are driven by vibrator means, the vibrator means of the pans 23, 24 and 25 being shown at 26, 27 and 28 respectively. As mentioned in connection with the bulk product conveyor pans, fewer or more dribble conveyor pans can be provided, according to the nature of the product.

The dribble product receiving pan 23 is provided with an unshown level control device similar to that provided for the receiving conveyor pan 10. This level control device controls the operation of the cross-conveyor pan 16 to maintain an optimum quantity of dribble product in the pan 23 available for use as dribble feed, the prevailing surplus dribble product being permitted as previously stated to fall off the cross-conveyor pan 16 onto the bulk product in conveying pan 15.

Both the bulk discharge pan 18 and the dribble discharge pan 25 are arranged to deliver pieces of the product into a common hopper 30 which is weighed by a weighing scale 31. The greater proportion of each batch of product is fed quickly into the hopper 30 by the bulk feed conveyors 15, 17 and 18. The actual weight product fed into the hopper 30 by the bulk feed conveyors does not have to be controlled to any great degree of accuracy provided that it is less than the required minimum batch weight, and the amount of the bulk feed discharged is only roughly determined. When this amount has been discharged into the hopper 30, the bulk feed conveyors 15, 17 and 18 are stopped and the dribble feed conveyors 16, 23, 24 and 25 are stated so that the dribble feed makes up the weight in the hopper 30 until the minimum batch weight is just achieved. When the weighing scale 31 detects that the predetermined weight of the batch has been reached the dribble feed conveyors are stopped and the hopper 30 is emptied. In some cases the dribble feed conveyors 16, 23, 24 and 25 can be started before or after the bulk feed conveyors 15, 17 and 18 are stopped.

Although not shown in the drawings, each weighed batch of product would normally be discharged from the hopper 30 into a form and fill packaging machine so that each batch will be packed into an individual bag.

A suitable system for controlling the operation of the conveyor pans in co-ordination with the weighing device is described in our British Patent Application No. 34039/73.

Figure 4:
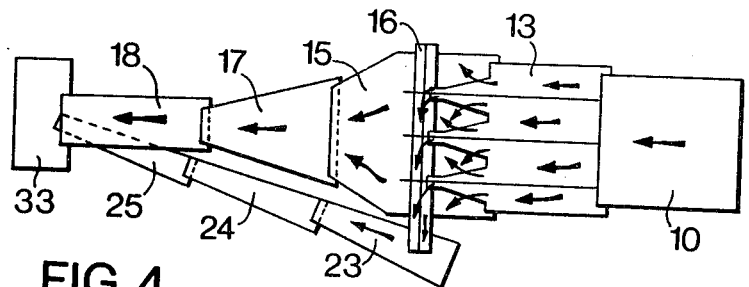
FIG. 4 is a diagrammatic plan view of a further embodiment of the invention.
Figure 5:
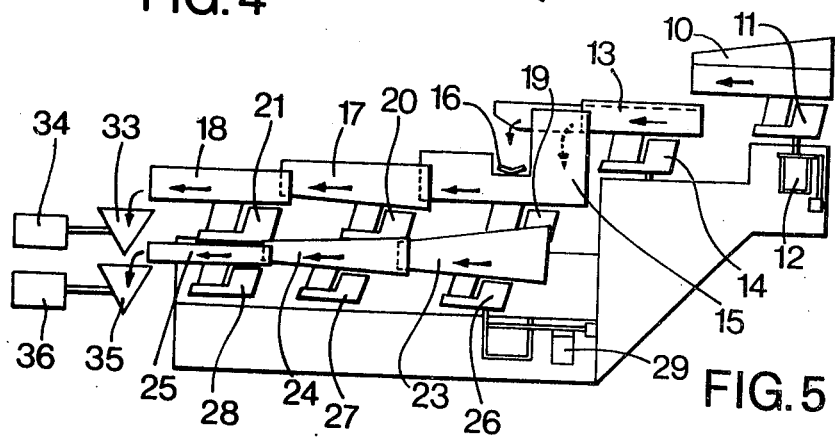
FIG. 5 is a side elevation of FIG. 4.

FIGS. 4 and 5 illustrate a similar apparatus to that just described with reference to FIGS. 1 to 3, and the same reference numbers have been used to identify equivalent components.

The receiving conveyor pan 10 receives the supply of product and the weight of product in the receiving conveyor pan 10 at any given moment is sensed by a level sensing device 12. The product passes from the receiving conveyor pan 10 to a conveying and grading pan 13 which divides the product into bulk product and dribble product as before, the required dribble product passing from a cross-conveyor pan 16 to a storage and conveying pan 23. The pan 23 is fitted with a level sensing device 29 which detects whether sufficient dribble product is contained in the pan 23 and actuates the cross-conveyor pan 16 accordingly.

As before, bulk product conveying pans 15, 17 and 18 are provided and these convey bulk product and excess dribble product to a first weighing station at which there is positioned bulk product hopper 33 having an associated weighing scale 34.

Similarly, dribble product from the storage conveyor pan 23 is fed by conveying pans 24 and 25 to a second weighing station at which there is positioned a hopper 35 having an associated weighing scale 36. The bulk product conveyors 15, 17 and 18 are operated to discharge bulk product into the hopper 33 until it contains a weight of bulk product that is slightly less that the minimum batch weight. When this condition is detected by the weighing scale 34, the bulk product conveyors 15, 17 and 18 are momemtarily stopped whilst the hopper 33 discharges its contents into the hopper 35. When the weighing scale 36 detects the arrival of a batch from the hopper 33, the dribble feed conveyors 23, 24 and 25 are operated to feed dribble product into the hopper 35 until the weighing scale 36 indicates that the minimum batch weight has just been achieved whereupon the dribble feed conveyors 23, 24 and 25 are stopped and the hopper 35 is emptied into a form and fill packaging machine as before.

As soon as the hopper 33 has been emptied into the hopper 35 and is ready to receive further product, the bulk feed conveyors 15, 17 and 18 are restarted to refill the hopper 33 and this continues while the batch in the hopper 35 is being made up to weight by the dribble feed conveyors. If the hopper 33 has received the necessary weight of bulk product before the preceding batch in the hopper 35 has achieved the minimum batch weight, the discharge of product from the hopper 33 will be delayed until after the hopper 35 has emptied and is ready to receive further product.

The construction and operation of the conveying and grading pan 13 is now described in greater detail with reference to FIGS. 6 and 11.

Figure 6:
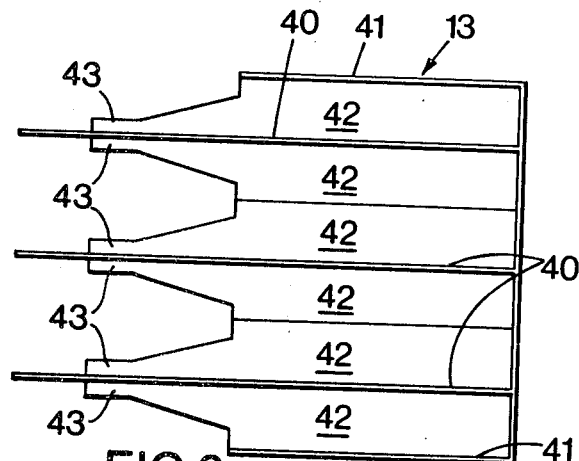
FIG. 6 is a plan view of one form of grading device.
Figure 7:
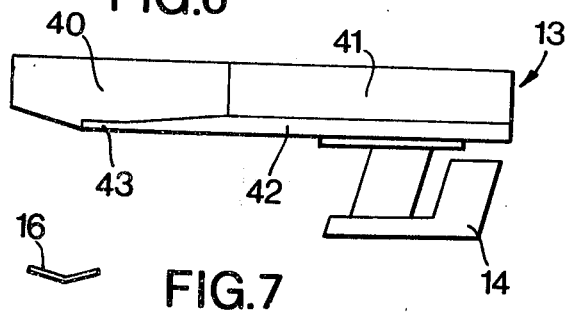
FIGS. 7 and 8 are respectively a side elevation and an end elevation of FIG. 6.
Figure 8:
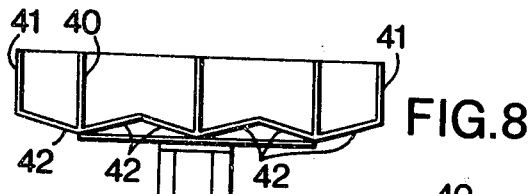

As shown in FIGS. 6 to 8 the conveying and grading pan 13 is divided into four channels by three plates 40 of which the opposite sides define the adjacent walls of adjacent channels. Side plates 41 define the outer walls of the outermost channels. The plates 40 and 41 lie in parallel vertical planes and extend in the direction of travel of the product. The base of each of the two centre channels is divided into two base portions 42 of similar area and shape to the bases 42 of the outer two channels. Each base or base portion 42 slopes downwardly in FIGS. 7 and 8 towards an adjacent side wall, defined by the side of the corresponding plate 40 or 41, so that the pieces of product in each channel will be biased towards at least one of its side walls. Thus, as the pieces of product are conveyed along the grading pan 13, they will tend to move against a channel side wall.

As shown in FIG. 6 the width of each base or base portion 42 decreases in the direction of travel of the pieces until only a relatively narrow ledge 43, remains at the delivery end of the grading pan 13. These narrow ledges 43 terminate abruptly in respective end edges as shown although the plates 40 and 41 are extended a short distance beyond the ends of the ledges 43. In this manner the base of each of the centre channels terminates in two end edges which extend from the adjacent walls defined by the plates 40 towards the generally V-shaped slot shown. This decrease in the width of each base or base portion 42 is selected so that larger-sized pieces of product cannot be supported by the ledges 43 and fall into the conveying pan 15 because the centre of gravity of the larger-pieces will lie outside the side edges of the ledges 43. Those smaller-sized pieces, whose centres of gravity still lie inside the side edges of the ledges 43, will travel to the ends of the ledges 43 and will fall off their end edges directly onto the cross-conveyor 16. When the cross-conveyor 16 is not being operated, the smaller-sized pieces will build up into individual heaps under the end edges of the ledges 43 and, when these heaps reach a sufficient height, the cross-conveyor 16 will no longer be able to support them, and they will fall off into the conveyor pan 15.

The width of the narrow ledges 43 determines which size of product is selected for the dribble conveyor and it will be appreciated that the width can be selected according to the size range of product anticipated. In practice the ideal size of the smaller-sized product extracted from the flow of product by the grading device will be the smallest possible consistent with an adequate supply to the dribble conveyor. Similarly the length of the narrow ledges 43 will be selected to be great enough to ensure that all the larger-sized product will fall off before it reaches a position above the cross-conveyor 16. However, in some cases, the product may be shaped so that pieces can hook over tops of the plates 40 and in this case the height and the extension of the plates 40 beyond the end of the narrow ledges 43 will ensure that such pieces fall into the conveyor pan 15. It will also be noted that the cross-conveyor pan 16 is located sufficiently far below the grading pan 13 that a build up of product on the pan 16 will not come into contact with the underside of the grading pan 13.

Figure 9:
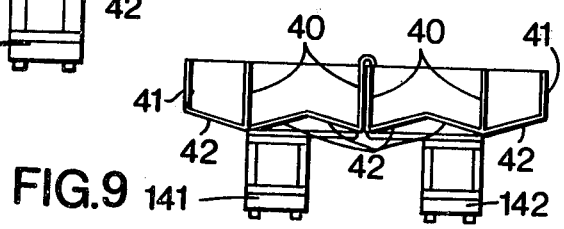
FIG. 9 is an end elevation similar to FIG. 8 but illustrating an alternative form of grading device.

As shown in FIGS. 6 to 8 the grading pan is formed as a single composite unit operated by a single vibrator device 14. Alternatively, as shown in FIG. 9, the grading pan 13 may be formed of two or more longitudinally-divided sections each comprising a channel or groups of channels, each section being independently supported and having an associated vibrator device 141 and 142.

Figure 10:
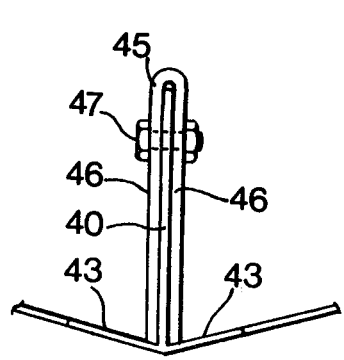
FIGS. 10 and 11 are respectively an enlarged end view and an enlarged plan view of a further alternative form of grading device.
Figure 11:
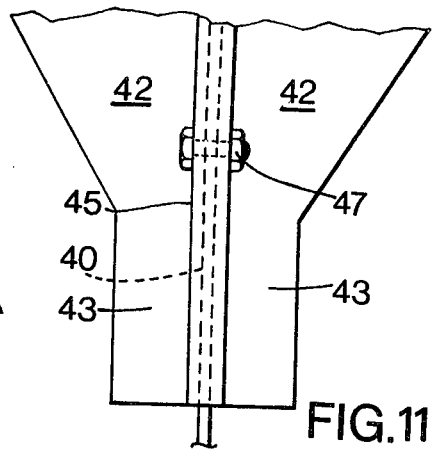

In FIGS. 10 and 11, an arrangement is shown for varying the size of product which is selected for the dribble conveyor. In this arrangement the width of the narrow ledge 43 is effectively varied by fitting spacers to the sides of the channel walls. A U-shaped cover 45 is fitted over each plate 40 so that its limbs 46 reach down to the upper surface of the narrow ledges 43. Each limb 46 defines a spacer of which the thickness equals the desired reduction in width of corresponding ledge 43. The cover 45 is fixed to the plate by nut and bolt assemblies 47 as shown.

The weighing scales 30, 34 and 36 may be provided with an automatic zeroing system to cater for any progressive accumulation of detritus from the product being packed. In this manner the weighing apparatus effectively recalibrates itself each time that the associated hopper 30, 33 or 35 is emptied so that the current empty weight of the hopper is taken as being zero.

Previously proposed batch weighing systems incorporating a product size grading arrangement and bulk, dribble feeding have graded the product in the final feeding stage immediately before the product is weighed. This method has the inherent disadvantage that any one group of graded smaller-sized product must be made up from a small random sample of the total product being fed through the system. Since any one small random sample is likely to have a great variation in both the number and size of smaller-sized pieces of the product in the sample, it becomes necessary either to increase the maximum size of the largest pieces of the product to be graded as small, so as to ensure that there will be a sufficient quantity of small pieces to make up the dribble weight, or to increase the running time of the dribble feed to allow sufficient small pieces to arrive at random from the total flow of product. In the first case the average weight of any weighed batch will be increased above the minimum batch weight. In the second case the average running time for producing a given number of weighed samples is substantially increased thereby decreasing the overall efficiency of the system.

The method of, and apparatus for, weighing a product in accordance with this invention offers the following advantageous features over alternative known systems:

1. The whole flow of the product is graded to ensure that the selection of only the smallest pieces will provide sufficient product for the dribble feed system to work efficiently.

2. The location of the grading device spaced two or more conveying pans distant from the weighing hopper enables the succeeding conveying pans to distribute the product evenly and thinly before discharge into the hopper.

3. The dribble feed system enables a volume of smaller-sized pieces of the product to be accumulated so that it will be available for use in making up the weight of each batch as and when it is needed and in the quantity that is needed and, at the same time, any excess of smaller-sized pieces will be returned automatically to the bulk feed system.

4. The provision of a dribble feed system enables the desired minimum batch weight to be achieved more accurately than if the only feed consists wholly of large sized product or a mixture of large and small sized product.

5. The dual hopper arrangement is also faster than alternative systems in achieving an accurate weight in the hopper, as the dribble feed system can operate at the same time as the bulk feed.

What I claim as my invention and desire to secure by Letters Patent of the United States is:

1. A method of weighing a product made up of irregular pieces into a batch of predetermined weight, including grading a flow of the irregular pieces to separate smaller-sized pieces from the flow, conveying the remaining flow of pieces towards a weighing device, delivering pieces from the remaining flow to a first weighing station of the weighing device until a batch of the product is accumulated having a weight slightly less than said predetermined weight, subsequently transferring the batch to a second weighing station of the weighing device for determining when the batch just achieves the said predetermined weight, and adding the smaller-sized pieces to the second weighing station whilst pieces are being delivered from the remaining flow to the first weighing station for accumulating the next batch.

2. Apparatus, for weighing a product made up of irregular pieces into a batch of predetermined weight, including a first conveyor means for conveying the irregular pieces, a grading device to which the irregular pieces are conveyed by said first conveyor means, said grading device being arranged to separate the irregular pieces into two fractions respectively containing relatively smaller-sized pieces and relatively larger-sized pieces, a weighing device for weighing pieces of the product, a second conveyor means for conveying the relatively larger-sized pieces from the grading device to the weighing device, a third conveyor means for conveying the relatively smaller-sized pieces from the grading device to the weighing device, control means associated with the weighing device and the second and third conveyor means whereby the second conveyor means will be operated to deliver relatively larger-sized pieces to the weighing device until a batch has been accumulated having a weight slightly less than said predetermined weight and the third conveyor will be operated to add relatively smaller-sized pieces to the batch until the said predetermined weight is just achieved, and a demand-sensing device arranged operatively between said grading device and said third conveyor means for sensing the rate at which smaller-sized pieces should be supplied to the third conveyor means to maintain a satisfactory equilibrium and for returning any surplus supply of smaller-sized pieces to said second conveyor means.

3. Apparatus as in claim 2, in which the demand-sensing device comprises a fourth conveyor means which conveys smaller-sized pieces from the grading device to said third conveyor means, said fourth conveyor means extends over a portion of said second conveyor means remote from the weighing device, and said fourth conveyor means is arranged so that any surplus supply of the smaller-sized pieces will accumulate on it and then fall on to said second conveyor means.

4. Apparatus as in claim 2, in which said weighing device has first and second weighing stations, said second conveyor means is arranged to convey the larger-sized pieces to said first weighing station and the third conveyor means is arranged to convey the smaller-sized pieces to said second weighing station, and said control means is arranged to transfer a batch of accumulated pieces from said first station to the second weighing station when it has a weight slightly less than said predetermined weight, whereby the third conveyor adds smaller-sized pieces to the partially completed batch at said second weighing station whilst the second conveyor is delivering larger-sized pieces to said first weighing station for accumulating the next batch.

5. Appartus as in claim 2 in which said grading device defines two or more parallel channels which are bounded by parallel walls, said channels have respective bases jointly defining a supporting surface along which the pieces of product will travel in a predetermined direction towards two end edges defined by the bases, and said two end edges extend from the adjacent walls towards a generally V-shaped slot formed in the base.

6. Apparatus as in claim 5, in which the base of each said channel slopes downwards towards both said boundary walls to bias the pieces of product towards said boundary walls during grading.

7. Apparatus as in claim 5, in which the walls project beyond the end edges of the channels to a position that is over said second conveyor means, whereby any larger-sized pieces that may become hooked over the tops of the walls will be returned to the flow of larger-sized pieces on the second conveyor means.

8. Apparatus as in claim 5, in which spacers are secured to the sides of said walls to reduce the size of the pieces to be selected for delivery to said third conveyor means.

9. Apparatus as in claim 8, in which the spacers for the adjacent walls of adjacent said channels are formed as an inverted U-shaped cover.

* * * * *